(12) United States Patent
Schnurr

(10) Patent No.: US 11,919,213 B2
(45) Date of Patent: Mar. 5, 2024

(54) METHOD AND DEVICE FOR PRODUCING INJECTION-MOLDED PARTS BY A TWO-COMPONENT INJECTION-MOLDING TECHNIQUE AND INJECTION-MOLDED PART

(71) Applicant: Zahoransky Formenbau GmbH, Freiburg (DE)

(72) Inventor: Reinhard Schnurr, Muenstertal (DE)

(73) Assignee: Zahoransky Formenbau GmbH, Freiburg (DE)

(*) Notice: Subject to any disclaimer, the term of this patent is extended or adjusted under 35 U.S.C. 154(b) by 1403 days.

(21) Appl. No.: 16/220,210

(22) Filed: Dec. 14, 2018

(65) Prior Publication Data
US 2019/0118439 A1 Apr. 25, 2019

Related U.S. Application Data

(62) Division of application No. 14/105,338, filed on Dec. 13, 2013, now abandoned.

(30) Foreign Application Priority Data

Dec. 20, 2012 (DE) .......................... 102012025039.8

(51) Int. Cl.
*B29C 45/16* (2006.01)
*B29C 45/27* (2006.01)
(Continued)

(52) U.S. Cl.
CPC ........ *B29C 45/164* (2013.01); *B29C 45/1642* (2013.01); *B32B 3/263* (2013.01);
(Continued)

(58) Field of Classification Search
CPC .......................... B29C 45/164; B29C 45/1642
(Continued)

(56) References Cited

U.S. PATENT DOCUMENTS 4,411,282 A 10/1983 Wavering
5,023,041 A * 6/1991 Jones .................. B29C 33/0055
264/510
(Continued)

FOREIGN PATENT DOCUMENTS

CH 697026 3/2008
DE 102007023178 12/2007
(Continued)

OTHER PUBLICATIONS

Machine translation CH697026A5 (Year: 2005).*
Machine translation WO9910158A1 (Year: 1999).*
Machine translation JP4927987B2 (Year: 2012).*

*Primary Examiner* — Matthew J Daniels
*Assistant Examiner* — Wayne K. Swier
(74) *Attorney, Agent, or Firm* — Volpe Koenig

(57) ABSTRACT

A method for producing injection-molded parts by a two-component injection-molding technique in which a first material component is injected into a mold cavity and is displaced into peripheral regions of the mold cavity by injecting a second material component. The first material component is injected into a partial region of the mold cavity at a first gating point and the second material component is injected into the mold cavity at a second gating point and, as a result, the first material component is acted upon by the second material component and displaced in the direction of the regions of the mold to be filled with the first material component. The first material component is thereby displaced into regions of the mold at the wall, and the second material component is introduced in those regions of the mold as a core material and completely into other regions of the mold.

6 Claims, 2 Drawing Sheets

(51) Int. Cl.
  *B29L 31/42*    (2006.01)
  *B32B 3/26*    (2006.01)
(52) U.S. Cl.
  CPC .... *B29C 2045/167* (2013.01); *B29C 45/1676* (2013.01); *B29C 45/2708* (2013.01); *B29L 2031/425* (2013.01); *Y10T 428/24612* (2015.01)
(58) Field of Classification Search
  USPC ........................................................ 264/255
  See application file for complete search history.

(56) References Cited

U.S. PATENT DOCUMENTS

| | | | |
|---|---|---|---|
| 6,158,444 A | 12/2000 | Weihrauch | |
| 8,528,572 B2 | 9/2013 | Schwab et al. | |
| 2003/0070259 A1* | 4/2003 | Brown | B26B 21/528 |
| | | | 16/436 |
| 2004/0113312 A1* | 6/2004 | Strahler | B29C 45/16 |
| | | | 264/243 |
| 2007/0151058 A1* | 7/2007 | Georgi | B29C 45/1642 |
| | | | 15/167.1 |
| 2008/0083421 A1 | 4/2008 | Malvar et al. | |
| 2008/0313834 A1 | 12/2008 | Weber | |
| 2009/0293900 A1 | 12/2009 | Holloway et al. | |
| 2010/0052209 A1 | 3/2010 | Filipp et al. | |
| 2010/0307529 A1 | 12/2010 | Schwab et al. | |
| 2011/0041271 A1 | 2/2011 | Haung | |
| 2012/0241084 A1* | 9/2012 | Nasir | A61M 16/0402 |
| | | | 264/254 |
| 2013/0221572 A1* | 8/2013 | Berg, Jr. | B29C 45/1642 |
| | | | 425/588 |
| 2014/0291891 A1 | 10/2014 | Charnay | |
| 2016/0221234 A1* | 8/2016 | Sorrentino | B29C 45/1642 |

FOREIGN PATENT DOCUMENTS

| | | | |
|---|---|---|---|
| DE | 10130863 | 3/2010 | |
| EP | 0932371 | 8/1999 | |
| EP | 2106222 | 10/2009 | |
| JP | 4927987 B2 * | 5/2012 | ......... B29C 45/1642 |
| WO | WO-9910158 A1 * | 3/1999 | ........... B29C 45/0082 |

* cited by examiner

METHOD AND DEVICE FOR PRODUCING INJECTION-MOLDED PARTS BY A TWO-COMPONENT INJECTION-MOLDING TECHNIQUE AND INJECTION-MOLDED PART

INCORPORATION BY REFERENCE

The following documents are incorporated herein by reference as if fully set forth: U.S. patent application Ser. No. 14/105,338, filed Dec. 13, 2013, and German Patent Application No. 102012025039.8, filed Dec. 20, 2012.

BACKGROUND

The invention relates to a method for producing injection-molded parts by a two-component injection-molding technique, in which a first material component is injected into a mold cavity of an injection mold and is displaced into peripheral regions of the mold cavity by injecting a second material component.

The invention also relates to a device for producing injection-molded parts by the two-component injection-molding technique with a mold having a mold cavity for the injection-molded part to be molded, and also relates to an injection-molded part produced by the two-component injection-molding technique.

Such methods, which are also referred to as sandwich methods or co-injection methods, are known. They involve first injecting a first material component into a mold, and subsequently injecting a second material component into the mold at the same injection point, with the first material component being displaced by the second material component into the wall regions of the mold as outer material and the second material component forming a core, which cannot be seen from the outside on the finished product. Due to the cooling down of the first material component on the outer wall, the second material component only flows in the core region of the mold. Depending on the temperature of the materials and the cooling properties of the mold, the thickness of the outer layer may vary. In the case of interdental brushes, which have a thin tip, it may happen that no material of the second material component penetrates into the narrow tip area, and consequently it has no core material, whereby the interdental brush is too soft at the tip and bends over when it is placed against an interdental space.

A product produced by such a method is known for example from EP 2 106 222 B1.

With this method, or with a sandwich method or co-injection method, it is only possible however to produce injection-molded parts that exclusively have the first material component on the outside, and the second material component forms an inner core and is completely hidden within the first material component.

Interdental cleaners, such as are described for example in EP 0 932 371 B1, in which a soft plastics material is provided in certain regions on a harder carrier material, consequently cannot be produced by such a method. In the method according to EP 0 932 371 B1, a soft plastics component is injected onto a previously injected carrier part. However, the transfer of the carrier part for the molding on of the soft plastics component is difficult due to the dimensions of the small, thin carrier part.

SUMMARY

There is therefore the object of providing a method of the type mentioned at the beginning that can be used for producing injection-molded parts which have an outer material component that has in certain regions a second material component as a core, and the second material component in certain regions also being visible in the outer region of the injection-molded part.

Furthermore, a device for carrying out the method is to be provided. Moreover, an injection-molded part produced by the two-component injection-molding technique, the material components of which are both visible on the outer side, is to be provided.

With regard to the method, the solution according to the invention that achieves this object consists in that the first material component is injected into a partial region of the mold cavity at a first gating point, in that the second material component is injected into the mold cavity at a second gating point and, as a result, the first material component is acted upon by the second material component and is displaced in the direction of the regions of the mold to be filled with the first material component, the first material component being displaced into regions of the mold at the wall, and the second material component being introduced on the one hand at least in certain regions as a core material into these regions of the mold and on the other hand completely into other regions of the mold.

Injecting the two material components at different gating points avoids the first material component coming to lie completely against the mold walls. The second material component fills part of the mold cavity, including in the peripheral region, so that no material of the first material component can get into this region. On the other hand, the first material component is acted upon by the second material component and displaced, so that thin outer regions of the mold, for example for bristles or lamella-like cleaning elements, are filled with the first material component. As is customary in two-component injection molding, the first material component is displaced by the injection pressure of the second material component into outer regions and, in specific regions, the second material component penetrates as a core into the first material component. In other regions of the mold which are in the area of the gating point of the second material component and into which the first material component has not penetrated, the second material component completely fills the mold cavity, so that this material component remains visible on the finished injection-molded part, for example as a handle.

In order to ensure that the first material component penetrates into all the regions of the mold that are to be filled with the first material component, it is expedient if more material of the first material component is injected than is required for filling the regions of the mold that are to be filled with the first material component. While the first material component is being acted upon by the second material component, the first material component is displaced into the desired peripheral regions of the mold cavity. The amount of the second material component is in this case definitely sufficient to fill all the desired regions of the mold. Possibly excess material of the first material component can in this case flow back into the gating region of the first material component due to the injection pressure of the second material component.

In order also to ensure that all the desired regions of the mold are filled with the second material component and the second material component forms a core for the first material component in the regions intended for it, it may be expedient if the injection of the second material component continues until the second material component flows into the gating point of the first material component.

During the injection of the second material component, the counter-pressure at the first gating point may be increased. As a result, the inflow behaviour of the second material component and the displacement of the first material component by the second material component are improved.

To shorten the processing speed, it is advantageous if the injection of the first material component and of the second material component takes place simultaneously or is begun simultaneously. Usually, less material of the first material component than of the second material component is required, so that, given suitable dimensioning, the injection of the first material component has been completed when the second material component impinges on the injected first material component in order to displace it.

With regard to the device, the invention is characterized in that the mold has a first gating point for the first material component, arranged in the area of the region of the mold that is intended for receiving a first material component, and a second gating point for the second material component, arranged in the area of the region of the mold that is intended for receiving a second material component.

In the case of previously known devices for producing injection-molded parts by the two-component injection-molding technique, a common gating point is provided for both material components. Consequently, penetration of the second material component into a region of the mold cavity in which no material of the first material component is present is not possible. Nor is this intended in the case of already known devices, since in the case of the already known two-component injection-molding technique the second material component is intended to serve exclusively as core material.

The separation of the gating points for the two material components now makes it possible with the device according to the invention to inject the second material component as core material for the first material component, in that the first material component is acted upon by the second material component and displaced, on the other hand regions in which the second material component is exclusively present can be formed, for example for the forming of a brush handle.

In order to be able to mold more injection-molded parts per unit of time, it is expedient if the mold is formed as a multi-cavity mold for multiple injection-molded parts.

The gating point for the second material component and/or the gating point for the first material component may have a hot runner system. The main runners may also have a hot runner system.

The region of the mold intended for receiving the first material component in the mold cavity may preferably have a helical or spiral outer contour. Appropriate contouring of the mold cavity allows a correspondingly helical or spiral area of use for the finished injection-molded part to be molded, which may be advantageous in particular in the case of interdental cleaning brushes.

The injection-molded part produced by the two-component injection-molding technique is characterized according to the invention in that the injection-molded part has at least one area of use with a core region of a second material component and with an outer region of a first material component, surrounding the core region, and also a handle area of the second material component, adjoining the at least one area of use.

Injection-molded parts with a basic body of one material and elements of use applied thereto of another material are known per se. These are usually produced by the basic body being molded in an injection-molding machine and this basic body being transferred into a further mold, in order to mold on the elements of use. In the case of small injection-molded parts such as interdental brushes, the transfer of the basic body is difficult, however, on account of its small dimensions.

On the other hand, injection-molded parts produced by the two-component injection-molding technique have so far only ever had one material component on the outer side, while the second material component is arranged exclusively inside the injection-molded part as a core.

The injection-molded part according to the invention thus combines the advantages of the two previously known injection-molded parts, that is the simplified production by the two-component injection-molding technique and the functionality of two material components in the outer region.

It is in this case expedient if the first material component is a soft-elastic plastic and the second material component is a hard plastics material. The first material component may for example be a soft material, preferably TPE, which is suitable for the cleaning of interdental spaces without causing injuries in the oral cavity, and the second material component is a hard plastics material, which on the one hand serves as a core for the first material component and prevents for example an interdental cleaner from bending over when this is inserted into an interdental space, and which on the other hand can form a stable handle area.

In particular when the injection-molded part is formed as an interdental cleaner, the outer region of the first material component may be formed helically or spirally. This makes thorough cleaning results possible. Moreover, the demolding of the injection-molded part after molding is made easier in comparison with injection-molded parts in which the first material component forms individual bristles or lamellae.

The injection-molded part may preferably have two gating points for the two material components, it being possible to see at one of the gating points the material that has been injected at the other gating point.

Alternatively, the injection-molded part may have two gating points for the two material components, material of one of the material components being arranged in the area of the gating point for the other material component.

BRIEF DESCRIPTION OF THE DRAWINGS

The method according to the invention, the device and the injection-molded part are explained in more detail below on the basis of the drawings, in which, in a partly schematized form.

DETAILED DESCRIPTION OF THE PREFERRED EMBODIMENTS

Figure 1:
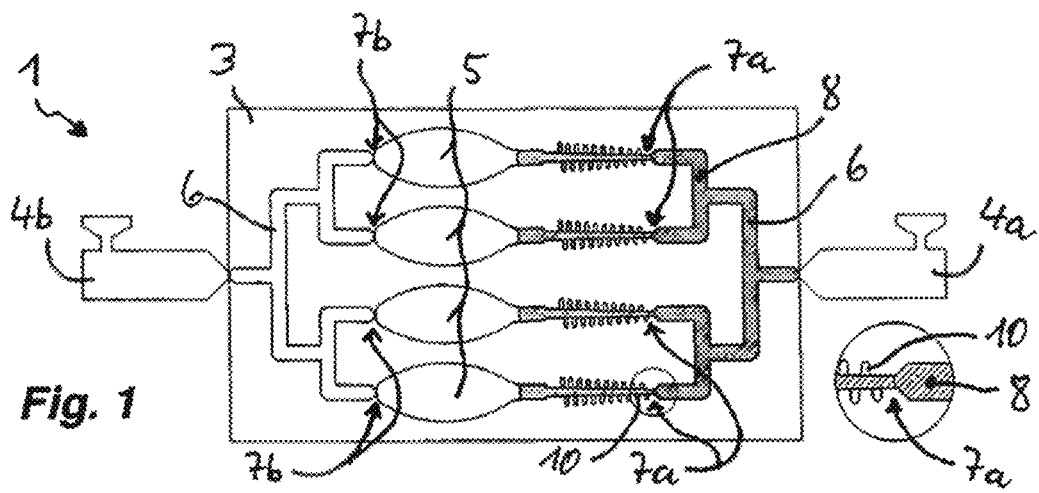
FIG. 1 shows an injection mold during the injection of a first material component.
Figure 2:
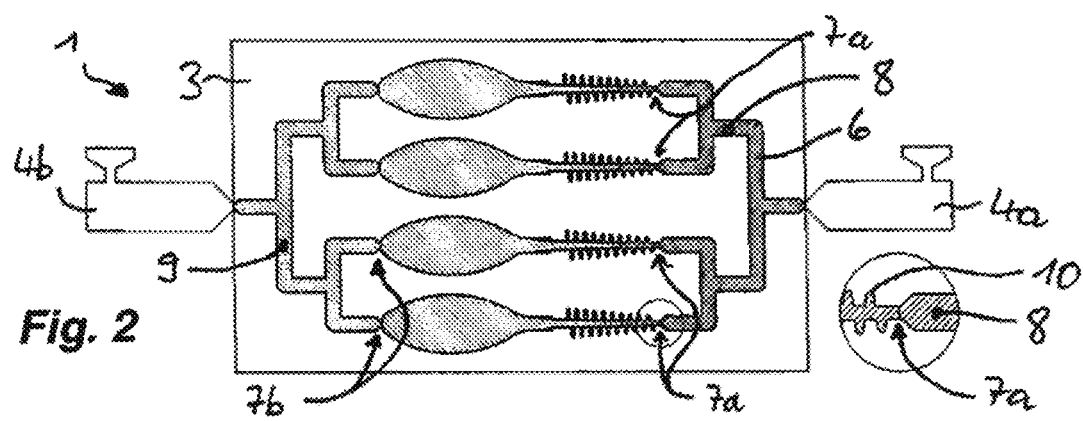
FIG. 2 shows the injection mold during the injection of a second material component.
Figure 3:
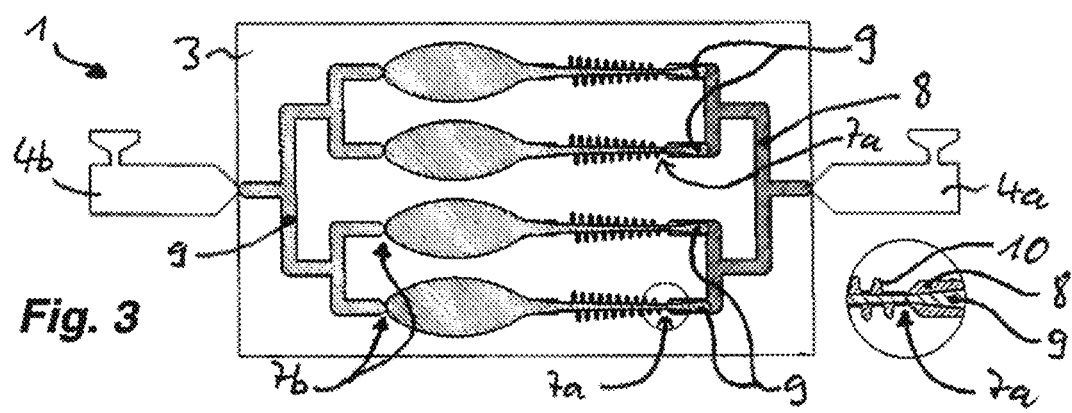
FIG. 3 shows the injection mold after the ending of the injecting operation.

According to FIGS. 1 to 3, a device, denoted as a whole by 1, for producing injection-molded parts 2 by the two-component injection-molding technique has a mold 3 and two injection-molding units 4a, 4b. The mold 3 is formed as a multi-cavity mold for four injection-molded parts 2 (FIG. 4) and has four mold cavities 5 with corresponding feed lines 6 from the injection-molding units 4a, 4b to the mold cavities 5. The mold cavities 5 are respectively assigned two gating points 7a, 7b.

The mold 3 according to FIGS. 1 to 3 is formed for the injection-molding of interdental cleaning brushes. For their production, first a first material component 8 is injected from the first injection-molding unit 4a via first gating points 7a into the individual mold cavities 5 (FIG. 1). The first material component 8 is in this case a soft-elastic plastic, which forms the cleaning area on the finished injection-molded part 2. The gating points 7a for the first material component 8 are respectively arranged in the area of the region of the mold 3 that forms the end on the side to be used. The first material component 8a thereby first flows past the lamella-like recesses 10, which form the cleaning areas of the finished interdental brush, since the first material component 8 can escape into the free region of the mold that is remote from the first gating point 7a. The keeping clear of the lamella-like recesses 10 can be seen in particular in the encircled representation of a detail that is additionally shown in FIG. 1.

Subsequently, a second material component 9 is injected from the second injection-molding unit 4b via second gating points 7b into the mold cavities 5 of the mold 3 (FIG. 2). The second material component 9 thereby respectively fills the region of the mold cavity 5 that is facing the second gating point 7b and then acts upon the first material component 8. Due to the high pressure that is applied in the two injection-molding units 4a, 4b, the first material component 8 is displaced into the lamella-like recesses 10, which can be seen in particular in the encircled representation of a detail of FIG. 2. Moreover, the second material component 9 penetrates as core material into the first material component 8 in the region of the mold cavity 5 that forms the cleaning area.

The injection of the first material component 8 and of the second material component 9 may take place one after the other or simultaneously.

As illustrated in FIG. 3, the injection of the second material component 9 continues until the second material component 9 flows into the gating point 7a of the first material component 8. This over injection ensures that the entire cleaning area of the finished injection-molded part 2 that is provided with the first material component 8 in the outer region is provided with a core of the harder, second material component 9, which stabilizes the cleaning area and makes the handling of the interdental brush easier.

Figure 4:
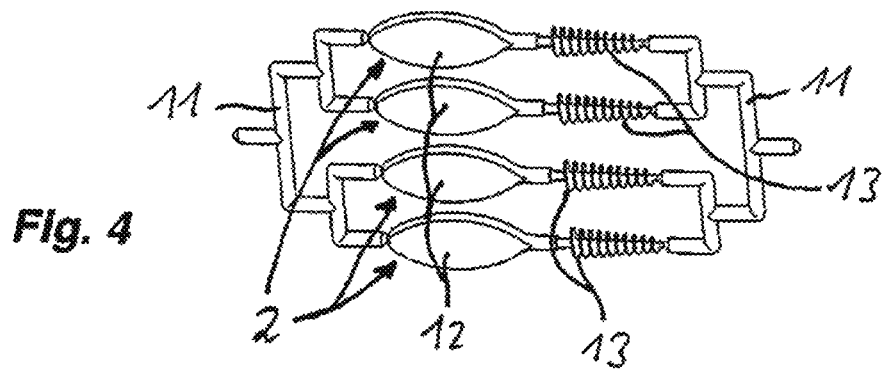
FIG. 4 shows finished injection-molded parts molded in the injection mold according to FIGS. 1 to 3.

FIG. 4 shows the finished-molded injection-molded parts 2 removed from the mold 3, together with the still molded-on sprues 11. The injection-molded parts 2 have in each case a handle area 12 of the second material component 9 and also an area of use 13. The area of use 13 in this case consists of an inner, stabilizing core of the second material component 9 and also an outer region of the first material component 8, which forms the cleaning area of soft-elastic plastic for tooth cleaning. The outer region is in this case helically or spirally formed. This continuous helix or spiral form makes particularly good cleaning results possible. Moreover, the demolding of the first material component (8) from the mold (3) is made easier.

Consequently, injection-molded parts 2 in which, as a difference from previously known two-component injection-molding methods, both material components 8, 9 can be seen on the outside and perform a respective function can be produced in the device 1 by the two-component injection-molding technique. A transfer, difficult in particular in the case of small moldings, of a partial molding for the molding-on of a second material component, as in the case of conventional moldings in which a second material component is to be attached to a carrier part only in partial regions, is not required.

FIGS. 5 to 9 show the production of a brush as an injection-molded part 2 from two material components 8, 9.

Of the mold 3, only the inner contours of the mold cavity 5 and the feed lines 6 of the injection-molding units are in this case represented.

Figure 5:
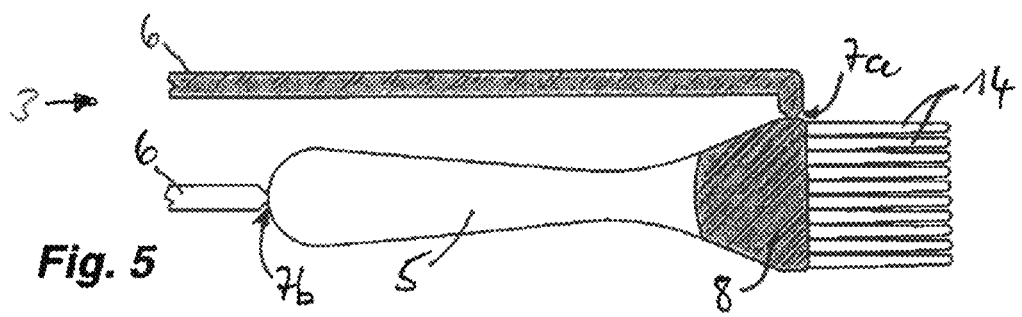
FIG. 5 shows a further injection mold during the injection of a first material component.
Figure 9:
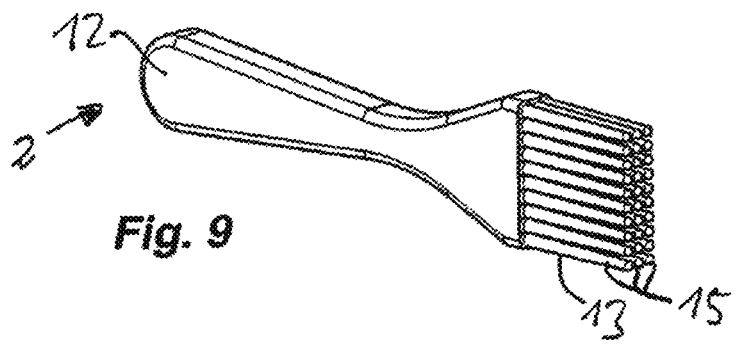
FIG. 9 shows a finished injection-molded part molded in the injection mold according to FIGS. 5 to 7.

Also in the case of this embodiment, the first material component 8 is injected into the mold cavity 5 at a first gating point 7a (FIG. 5). The first gating point 7a is in this case located in the region of recesses 14 to be filled with the first material component 8, which form bristles 15 of a brush on the finished injection-molded part 2 (FIG. 9). Since, when injecting the first material component 8, there is not yet any counter-pressure, the first material component 8 initially does not yet flow into the recesses 14.

Figure 6:
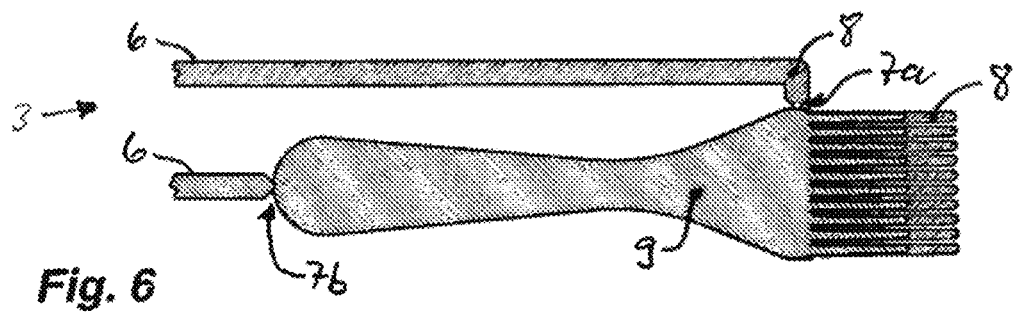
FIG. 6 shows the injection mold according to FIG. 5 during the injection of a second material component.

According to FIG. 6, the second material component 9 is injected into the mold cavity 5 at the second gating point 7b. Due to the high injection pressure at the two injection units, the first material component 8 is acted upon by the second material component 9 and displaced into the recesses 14. The first material component 8 thereby comes to lie against the walls of the mold cavity 5. The second material component 9 thereby also flows into the recesses 14 in certain regions and thus forms a core region, which stabilizes the bristles 15 in the area of use 13 of the injection-molded part 2. Since the second material component 9 requires a certain time before it reaches the region of the first material component, the injection of the two material components 8, 9 may also take place simultaneously.

Figure 7:
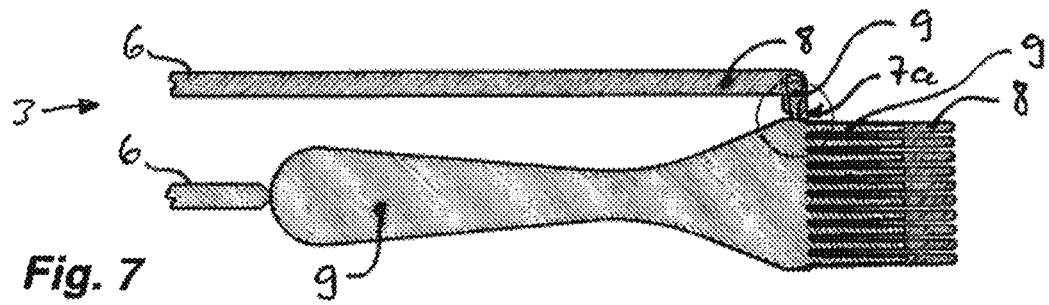
FIG. 7 shows the injection mold according to FIGS. 5 and 6 after the ending of the injecting operation.
Figure 8:
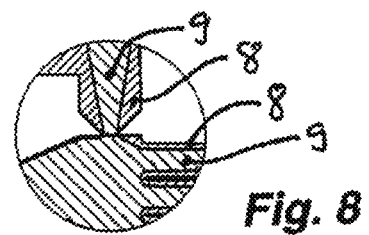
FIG. 8 shows a detailed representation of a gating point of the injection mold from FIG. 7.

It can be seen in FIG. 7, and in particular the detailed representation according to FIG. 8, that the injection of the second material component 9 continues until the second material component 9 flows into the gating point 7a for the first material component 8.

FIG. 9 shows the finished injection-molded part 2 with the handle area 12 of the second material component 9 and the area of use 13 with bristles 15 of the first material component 8, the bristles 15 having in certain regions a core of the second material component 9 (FIGS. 6 and 7).

In order to ensure that material is also sufficiently available for all regions that are to be filled with the first material component 8, at first more material than would be computationally required is injected during the injection of the first material component 8. During the injection of the second material component 9, and as a result of the first material component 8 being acted upon by the second material component 9, any excess material of the first material component 8 can flow back again into the gating point 7a of the first material component 8.

In order that the first material component 8 reliably flows into all the desired regions when it is acted upon by the second material component 9, and the second material component 9 also in certain regions flows into the corresponding regions of the mold as core material, the counter-pressure in the injection-molding unit 4a for the first material component 8 may be increased during the injection of the second material component 9.

The invention claimed is:

1. A method for producing injection-molded parts, which have at least one use area with a bristle region, by a two-component injection-molding technique comprising:
   injecting a first material component into a mold cavity of a mold comprising a wall at a first gating point;
   injecting a second material component into the mold cavity at a second gating point and displacing the first material into peripheral regions of the mold cavity with the second material component;
   wherein, the first material component is softer than the second material component and is acted upon by the second material component and is displaced in a direction of regions of the mold to be filled with the first material component, the first material component being displaced into regions of the mold at the wall; and
   wherein the second material component is introduced at least in certain regions as a core material into the regions of the mold to be filled with the first material and completely into other regions of the mold, and the second material component partially penetrates into the bristle region,
   wherein the regions of the mold to be filled with the first material component have a helical or spiral contour.

2. The method as claimed in claim 1, further comprising injecting more material of the first material component than is required for filling the regions of the mold that are to be filled with the first material component.

3. The method as claimed in claim 1, wherein the injecting of the second material component continues until the second material component flows into the gating point of the first material component.

4. The method as claimed in claim 1, wherein, during the injection of the second material component, a counter-pressure at the first gating point is increased.

5. The method as claimed in claim 1, wherein the injecting of the first material component and of the second material component takes place simultaneously.

6. The method as claimed in claim 1, wherein the injecting of the first material component and of the second material component begins simultaneously.

* * * * *